April 8, 1930. K. FEILCKE 1,754,086
HOOD LEDGE PLATE AND MULTIPLE COMPARTMENT HOOD FOR AUTOMOBILES
Filed July 12, 1928 3 Sheets-Sheet 1

WITNESSES

INVENTOR
Karl Feilcke
BY
ATTORNEY

April 8, 1930. K. FEILCKE 1,754,086
HOOD LEDGE PLATE AND MULTIPLE COMPARTMENT HOOD FOR AUTOMOBILES
Filed July 12, 1928    3 Sheets-Sheet 2

WITNESSES

INVENTOR
Karl Feilcke
BY
ATTORNEY

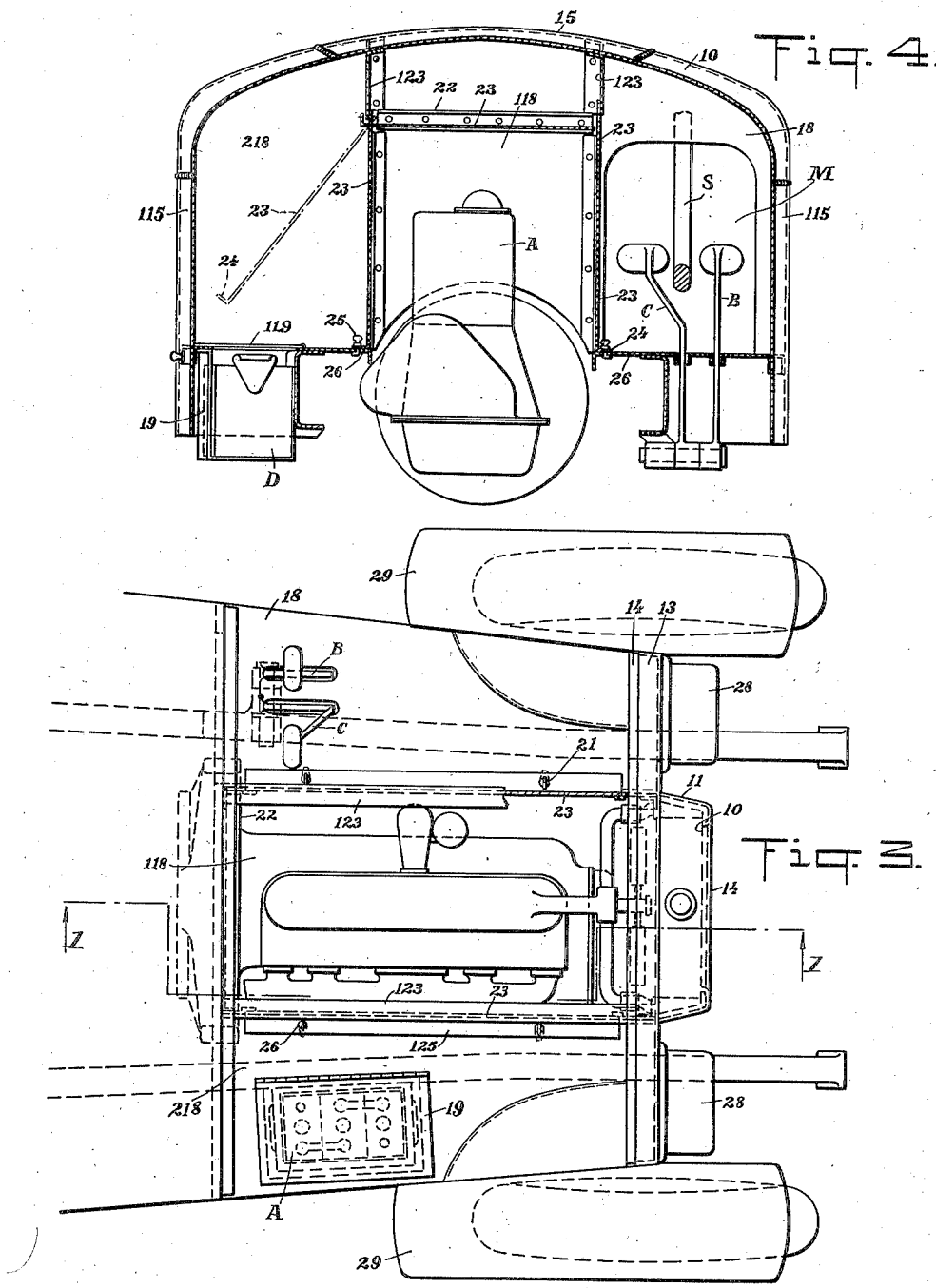

Patented Apr. 8, 1930

1,754,086

UNITED STATES PATENT OFFICE

KARL FEILCKE, OF TOLEDO, OHIO

HOOD LEDGE PLATE AND MULTIPLE-COMPARTMENT HOOD FOR AUTOMOBILES

Application filed July 12, 1928. Serial No. 292,074.

My invention relates to a novel front structure for automobiles, comprising a hood with a number of separate compartments underneath, and a new element of construction termed a hood ledge plate, which forms the characteristic part of this front structure.

On all present day automobiles the hood invariably rests with its front end on the radiator conforming to the shape of the same, then slopes up towards the rear and blends into the body cowl at the dash. As the radiator is naturally limited in size, and a too pronounced taper on the hood is impossible for practical as well as æsthetic reasons, the width of the body is largely determined by the shape of the radiator wherever a streamline effect is to be maintained. The natural result of this conventional front structure arrangement is that the space occupied by the car is poorly utilized for its functional purposes; a large part of the chassis in front of the body is reserved for the machinery only and cannot be used for the carrying of merchandise, passengers and baggage, and the full width of the chassis cannot be utilized for body purposes because the streamlines have to start with a rather narrow radiator.

The main object of my invention is to utilize by means of a novel front structure, a large percentage of the space in front of the body for storage purposes, and by using a hood ledge plate as the starting point for the hood and body streamlines, utilize the full width of the chassis for body purposes, while, at the same time, producing an assemblage having proper æsthetic effects.

A further object is to provide a wider and roomier body on a comparatively shorter wheelbase chassis than is now possible by making some of the space up to this time exclusively reserved for the power plant available for the driver and front seat passengers.

Other objects of my invention are to strengthen and yet to reduce in weight the front structure of an automobile by combining in a new construction element, the hood ledge plate, the functions of some or all of certain parts appurtenant to the car, such as fender brackets, lamp brackets, license plate holders and horn brackets; to eliminate the customary channels between the hood and front fenders and other dirt and snow-catching nooks and corners inevitable with the conventional front structure arrangement of head lamps and fender brackets, and so make the car easier to clean.

A final object of my invention is to ultimately relieve traffic congestion to a considerable extent by means of automobiles embodying my novel front structure. As these vehicles are shorter and utilize a greater percentage of road space they occupy for their functional purposes than present day cars, more goods or people can be transported in them through a certain street in a given time, and more of them can be parked simultaneously in the same street or garage.

The nature of my invention and the distinguishing features in which the invention resides, as well as their advantages, will clearly appear as the description proceeds.

Reference is to be had to the accompanying drawings forming a part of this specification, it being understood that the drawings are merely illustrative of one example of the invention.

Figure 3 is a plan view with the hood removed;

Figure 4 is a transverse vertical section;

Figure 5 is a fragmentary detail in vertical section showing a portion of a movable partition and one means of holding it in place, the view including a portion of the fixed bottom part of the front structure of the car to which the movable partition is fastened;

Figure 6 is a plan view of the parts shown in Figure 5;

Figure 1:
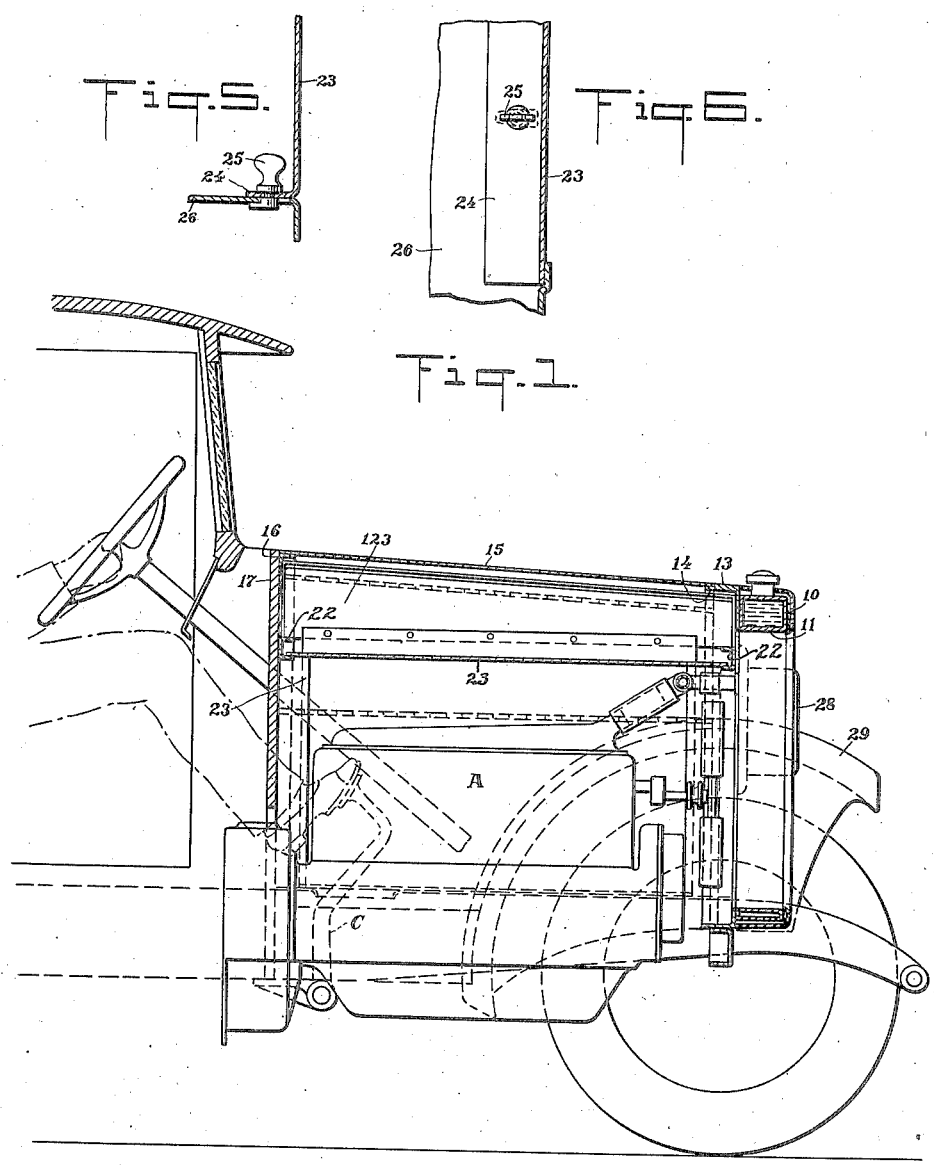
Figure 1 is a longitudinal vertical section of the front portion of an automobile embodying my invention, the section being indicated by the line 1—1 in Figure 3.
Figure 2:
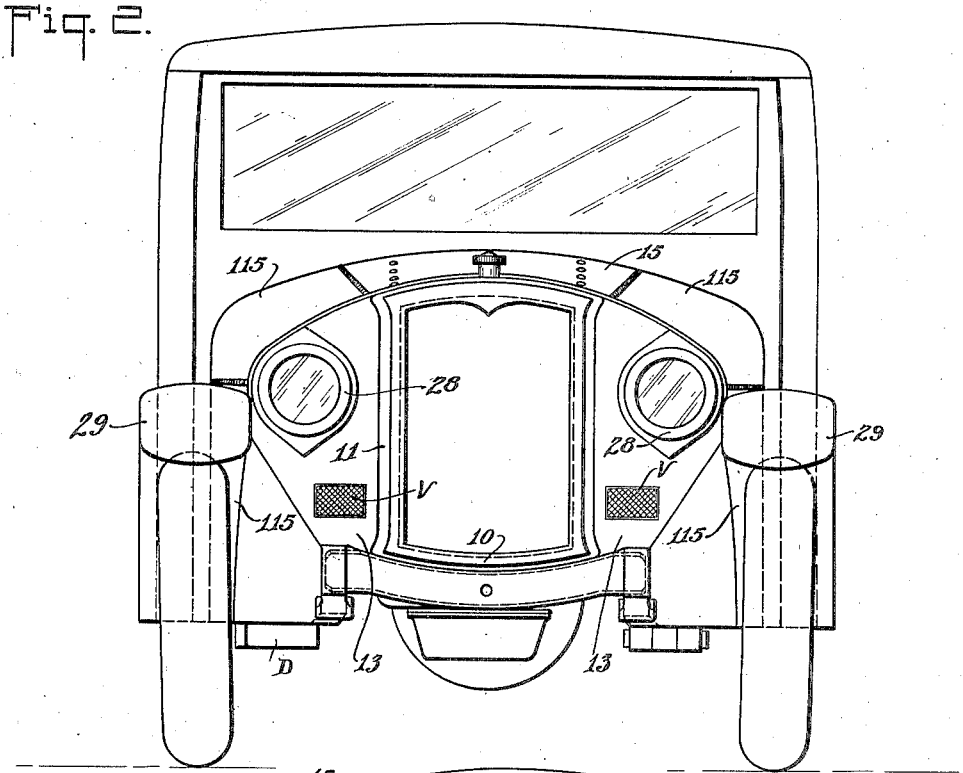
Figure 2 is a front elevation of an automobile, my invention being embodied in the front part thereof.
Figure 7:
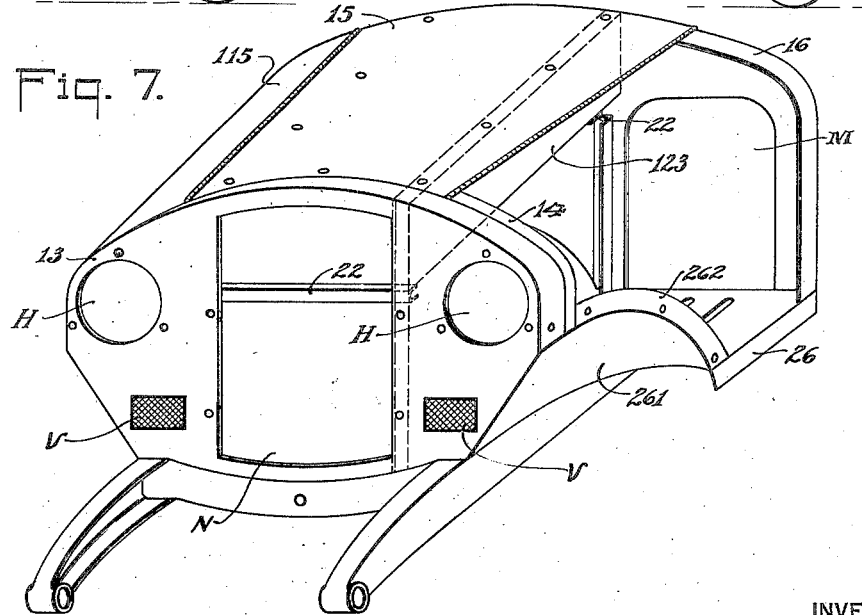
Figure 7 is a perspective view of the front structure simplified in order to bring out clearly the shape of the side compartment by omitting the radiator, head lamps, front fenders, pedals, steering post, the power plant and the hinged portions of the hood.

In the illustrated example of my invention, the numeral 13 indicates the new construction element designated as the hood ledge plate. This hood ledge plate 13 has a depressed flange 14 which forms a rest for the front end of the hood, the rear end of same being supported by an angle iron 16 on a body part 17. The hood includes a center piece 15 bolted at its front edge to the flange 14 and at the rear end to angle iron 16 and hinged portions 115 on either side of center piece 15, which hinged side portions 115 when raised in the usual manner afford access to the space under the hood.

The hood ledge plate 13 and the hood with its movable side pieces 115 form the outer shell of my novel front structure. The three compartments provided under this shell are designated respectively by the numerals 18, 118, 218. These compartments are produced by subdividing the space under the hood by means of two stationary lengthwise upper partitions 123 bolted to the center piece 15 of the hood, the body and the hood ledge plate respectively, and by two removable lower partitions 23. The bottoms of the side compartments 18 and 218 are formed by horizontal plates 26 attached to the frame side rails, the body and the hood ledge plate 13. The numerals 24 indicate flanges at the bottom of either partition 23, which flanges are adapted to be secured by any suitable fastening means 25 to hold the same to the bottom plates 26 of the side compartments when in closed position.

The central compartment 118 accommodates any approved power plant A, the two side compartments 18 and 218 are reserved for storage purposes and large enough to hold at least an ordinary suitcase or other articles for which there is usually little room in a fully occupied conventional passenger car. Underneath compartment 218 and accessible through a hinged door 119 is the battery D suspended in a hanger structure 19 on the frame side rail.

To make the power plant A easily accessible from either side after the hinged portions 115 are folded up and any articles stored in the compartments 18 and 218 have been removed, the partitions 23 can be quickly moved out of the way by tilting them up and sliding them over the central compartment onto channel bars 22 provided for the purpose on the body and hood ledge plate 13. An intermediate position attained during the tilting up or raising movement of one of the partitions 23 is shown in dash lines in the compartment 218 at the left of Figure 4, while the said partition 23 is shown also in full lines in its normal vertical position at the left of the said Figure 4. In addition to the said dotted line and full line positions at the left of Figure 4 I have illustrated said partition also in said Figure 4 in full lines in a horizontal position supported at the lower flange of horizontal channel bars 22 disposed above the compartment 118. The right hand partition 23 is shown in its normal vertical position at the inner side of compartment 18, but it will be readily understood that said right hand partition may be raised and moved to a position above the top flange of the channel bars 22, the left hand partition resting on the lower ledges or flanges of said channel bars 22. Hence, both partitions can be raised out of the way at the same time to rest on an upper and lower flange respectively of channel bars 22, thereby establishing communication between the several compartments 18, 118, 218 to afford access to the various compartments. Thus the power plant is made quickly and easily accessible notwithstanding the bulky structure that surrounds it.

The most suitable arrangement of the compartments and their number depends, of course, on the particular type of motor used. With V-shaped or radial engines, for instance, other arrangements, perhaps with horizontal partitions, may be more convenient and I do not confine my invention to the particular subdivisions shown.

Compartment 18 is not only used as a storage space but contains also the clutch pedal B, the brake pedal C, the steering post S, and also communication is established between said compartment 18 and the body front compartment by an opening M large enough for the driver to put his feet into compartment 18 to operate the pedals. With such an arrangement the driver can be seated partly alongside the engine instead of back of it as is now universally the case, and it becomes possible to put the same length of body as used on a conventional type car on an appreciably shorter wheelbase chassis. Similar arrangements can be made on the other side for the front seat passenger to put his feet into compartment 218.

The hood ledge plate 13 is attached in any suitable manner to the frame and extends clear across the car in order to support the front fenders 29, thus taking the place of the customary fender brackets. The hood ledge plate is braced towards the rear by the upturned front ends 261 of the bottom plates 26 which are shaped to give suitable clearance for the front wheels when the latter are turned for steering. These upturned front ends thus perform the function of the rear halves of the conventional fender skirts.

The upturned ledge 262 on ends 261 forms with the hood ledge plate flange 14, angle iron 16, and the downward side flange of the bottom plate 26 a rest for the hinged portion of the hood when in closed position. This hinged portion of the hood is cut in front to follow the curved shape of the ledge 262 in order to give proper fender clearance. The front fender 29 is bolted directly to ledge 262 and the hood ledge plate 13 and in this manner the customary gap between the hood and front fender is eliminated and a clean and smooth exterior without dirt and snow-catching nooks is obtained.

The hood ledge plate 13 also carries the head lights 28 which are mounted in holes H, the plate thus taking the place of the customary lamp brackets, and the license plate and horn, while not shown on the drawings, may also be directly attached to the plate thus eliminating their usual brackets, said ledge presenting sufficient area for the purpose. The hood ledge plate 13 consequently simplifies and lightens the whole front structure of an automobile by eliminating many parts, yet, undoubtedly, strengthens it at the same time by its inherent rigidness and secure bracing to the frame and body.

A large opening N in the hood ledge plate 13 admits air to the center compartment for cooling the engine. On water cooled cars the radiator core 10 with its shell 11 is bolted on the hood ledge plate 13 in such a manner that the air passing through the core also flows through hole N into the center compartment 118.

Compartments 18 and 218, being adjacent to the engine space and separated from the latter only by the removable partitions 23, are likely to become rather hot at times. To keep the temperatures in them down ventilators V have been installed in the hood ledge plate 13 where it forms the front walls of these compartments, and the air entering by means of same sweeps through the compartment and escapes through the opening M into the body front compartment also ventilating the latter effectively.

I would state further that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. In an automobile, a comparted structure having a body compartment, and compartments forward of the cowl and communicating with the body compartment, and means for controlling the operation of the vehicle, said means being disposed in one of said second mentioned compartments.

2. In an automobile, a plurality of compartments including a motor compartment; together with a hood extending over the compartments, and a ledge plate extending over all of the said compartments from side to side and affording support for said hood at the front.

3. In an automobile, a front structure, movable partitions dividing said structure into a plurality of compartments, the partitions being movable from a position dividing the structure into compartments to a position away from said first mentioned position, and means in said structure affording support for said partitions in the second mentioned position.

4. In an automobile, a front structure, movable vertical partitions dividing said structure into a plurality of compartments, and a horizontally disposed angle bar above the central compartment, said bar presenting upper and lower flanges, and said partitions being movable respectively onto the upper and lower flanges of said bar.

5. In an automobile, a plate attached crosswise to the frame in front of the engine, lengthwise extensions to this plate which act as fender skirts, and means connected with said plate to support the hood and the front fenders.

6. In an automobile, a plate attached crosswise to the frame in front of the engine, said plate adjoining the fender skirts at either side and supporting the hood and the front fenders, said plate also forming the front wall of the compartment or the compartments under the hood, except where openings in the plate admit air for cooling or ventilating purposes.

7. In an automobile, a body, a hood structure adjoining said body, said structure being bounded in the rear by the body, in front by a hood ledge plate extending across the vehicle from fender skirt to fender skirt, said fender skirts partially forming the side walls of the structure, a removable hood, and suitable bottom plates completing same.

8. In an automobile, a body, and independent hood structure adjoining the same, said structure comprising a hood ledge plate in front extending across the vehicle from fender skirt to fender skirt, and means connected with said plate for supporting the hood and the front fenders.

9. In an automobile, a body, an independent front structure adjoining the same, said structure comprising a hood ledge plate in front extending across the vehicle from fender skirt to fender skirt, said plate having an opening to admit air for the cooling system of the engine, and means connected with said plate for supporting the hood, the front fenders and the radiator, said radiator having a shape entirely independent of the contour of the plate.

Signed at Toledo in the county of Lucas and State of Ohio this 2nd day of July, A. D. 1928.

KARL FEILCKE.